United States Patent
Kumar et al.

(10) Patent No.: US 7,630,936 B2
(45) Date of Patent: Dec. 8, 2009

(54) ORDER SYSTEM PAYMENT ROUTING

(75) Inventors: Vinod Kumar, Bothell, WA (US); Caesar M. Samsi, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 321 days.

(21) Appl. No.: 11/518,106

(22) Filed: Sep. 7, 2006

(65) Prior Publication Data

US 2007/0282741 A1    Dec. 6, 2007

Related U.S. Application Data

(60) Provisional application No. 60/810,256, filed on Jun. 2, 2006.

(51) Int. Cl.
*G06Q 40/00* (2006.01)
(52) U.S. Cl. .............................. 705/39; 705/40; 705/41; 705/1; 707/103; 707/3; 395/227; 308/25
(58) Field of Classification Search ................ 707/103, 707/100, 3; 705/40, 41, 1; 395/227; 380/25
See application file for complete search history.

(56) References Cited

U.S. PATENT DOCUMENTS

| | | | | |
|---|---|---|---|---|
| 5,995,973 A | * | 11/1999 | Daudenarde | 707/103 R |
| 2004/0002918 A1 | * | 1/2004 | McCarthy et al. | 705/40 |
| 2004/0215560 A1 | * | 10/2004 | Amalraj et al. | 705/40 |
| 2005/0246193 A1 | * | 11/2005 | Roever et al. | 705/1 |

* cited by examiner

*Primary Examiner*—Harish T Dass
(74) *Attorney, Agent, or Firm*—Workman Nydegger (57) ABSTRACT

Aspects of the subject matter described herein relate to processing payment requests. In aspects, a user of an online system is allowed to pay for goods or services using a combination or one or more payment types including credit card, cash card, gift certificate, purchase order, money order, other payment types, and the like. A payment router determines which payment processor(s) needs to be involved to satisfy each payment request and routes payment requests to each payment processor as needed. Adding new payment methods and changing existing payment methods may be accomplished by changing a table or the like that associates payment methods with payment processors.

11 Claims, 6 Drawing Sheets

| Payment Method Name | Type | Payment Processor |
|---|---|---|
| Visa | 0 | Visa_Pipeline |
| AmericanExpress | 0 | Amex_Pipeline |
| CashCard | 1 | Cash_Pipeline |
| GiftCertificate | 2 | Gift_Certificate_Pipeline |
| MoneyOrder | 3 | Money_Order_Pipeline |

FIG. 6

ORDER SYSTEM PAYMENT ROUTING

CROSS REFERENCE TO RELATED APPLICATION

This application claims the benefit of U.S. Provisional Application No. 60/810,256, filed Jun. 2, 2006, entitled ORDER SYSTEM PAYMENT ROUTING, which application is incorporated herein in its entirety.

BACKGROUND

Increasingly, people are using online services to purchase goods. In a typical scenario, a person seeking to purchase a good, uses a Web browser to find a Web site of a vendor. The person then selects items that the person wishes to purchase. These items are then placed into a shopping cart. When the person is ready to buy the items, the person indicates that the person's shopping is complete and arranges for payment for the goods in the shopping cart.

SUMMARY

Briefly, aspects of the subject matter described herein relate to processing payment requests. In aspects, a user of an online system is allowed to pay for goods or services using a combination of one or more payment types including credit card, cash card, gift certificate, purchase order, money order, other payment types, and the like. A payment router determines which payment processor(s) needs to be involved to satisfy each payment request and routes payment requests to each payment processor as needed. Adding new payment methods and changing existing payment methods may be accomplished by changing a table or the like that associates payment methods with payment processors.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
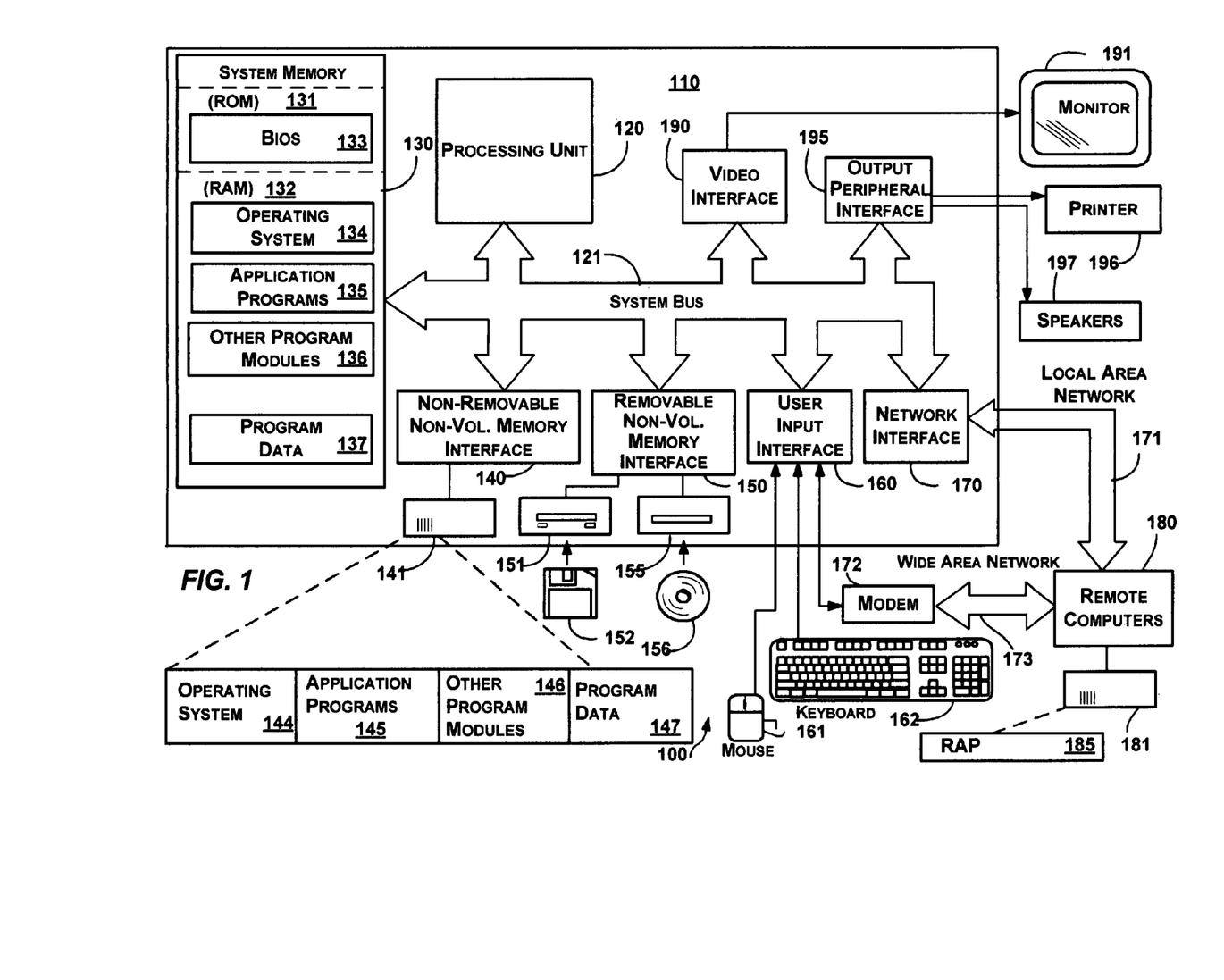
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
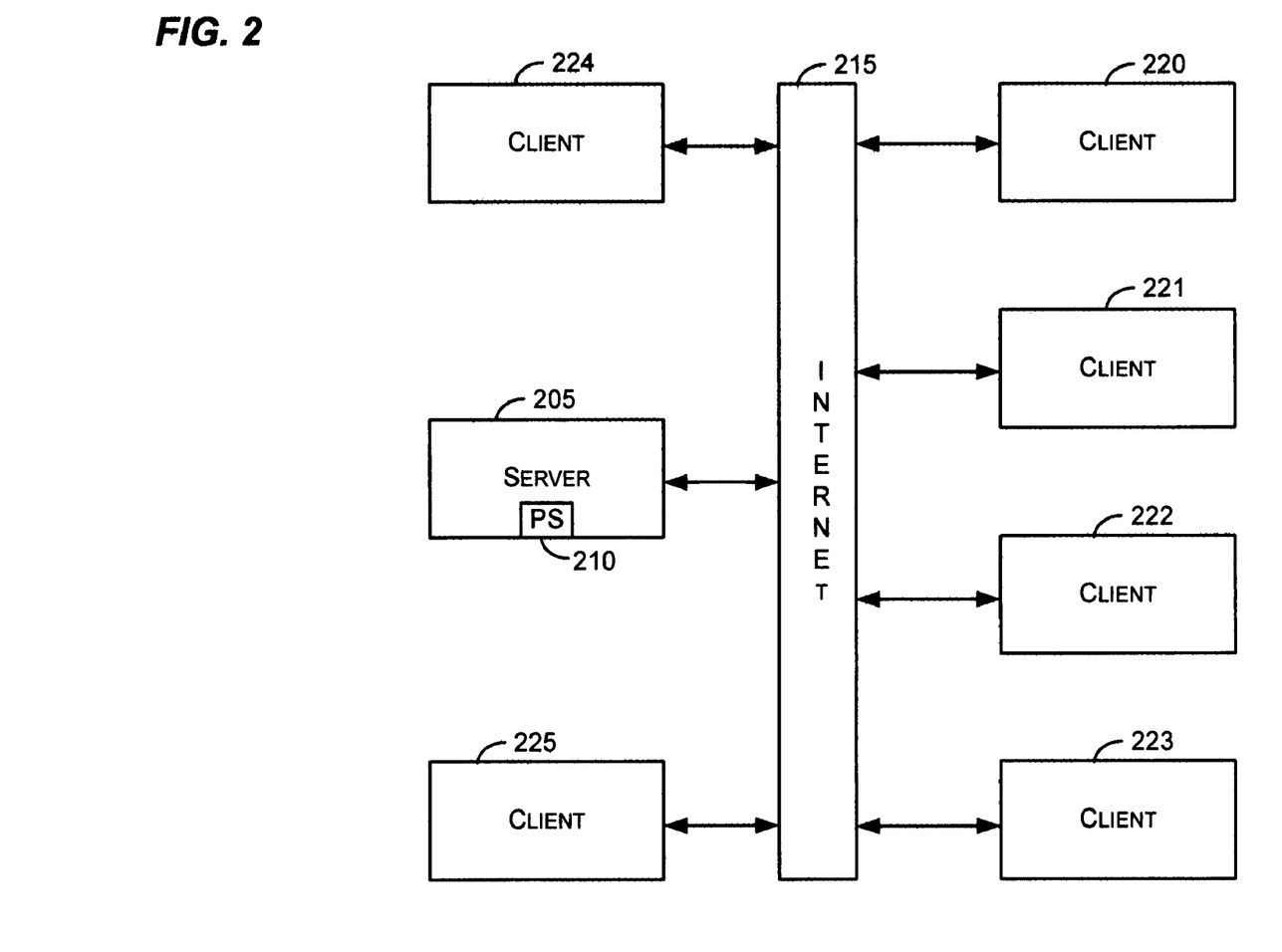
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes a server 205 and clients 220-225 and may include other components (not shown). The various entities may communicate with each other via various networks including intra-office networks and the Internet 215.

Each of the server 205 and the clients 220-225 may be implemented on one or more computers (e.g., computer 110 as described in conjunction with FIG. 1). The server 205 may, for example, host a Web server application (not shown) that allows the clients 220-225 to order goods and/or services (hereinafter collectively referred to as "goods").

In dealing with a client's order, the server 205 may create an object that identifies which goods a client wishes to purchase. This object may be associated with a graphical representation viewable to the client. This object is sometimes referred to herein as a shopping cart.

After a client indicates that the client wishes to proceed to the payment stage, the server 205 may provide one or more Web pages that allow the client to select one or more payment methods for paying for the goods associated with the shopping cart. Such payment methods may include, for example, any combination of one or more of a credit card, a cash card, gift certificate, a purchase order, a money order, proprietary payment methods such as PayPal®, and the like.

As will be described below, a system administrator or the like may readily modify the payment methods accepted by the server 205 and may also change the payment processors to which payment requests are routed. For example, if a vendor determines that it would be more cost effective to have another credit card company process Visa card payment requests, the vendor may route Visa payment requests to the other credit card company by making a configuration change. This may be done without changing routing for other types of payment requests (e.g., requests related to other credit cards, cash cards, etc.).

The server 205 includes a payment system 210 that is in charge of payment processing including routing payment requests to appropriate payment processors. The mechanics of the payment system 210 will be described in more detail below.

Although the environment described above includes one server and several clients, it will be recognized that more, fewer, or a different combination of these entities may be employed without departing from the spirit or scope of aspects of the subject matter described herein.

Figure 3:
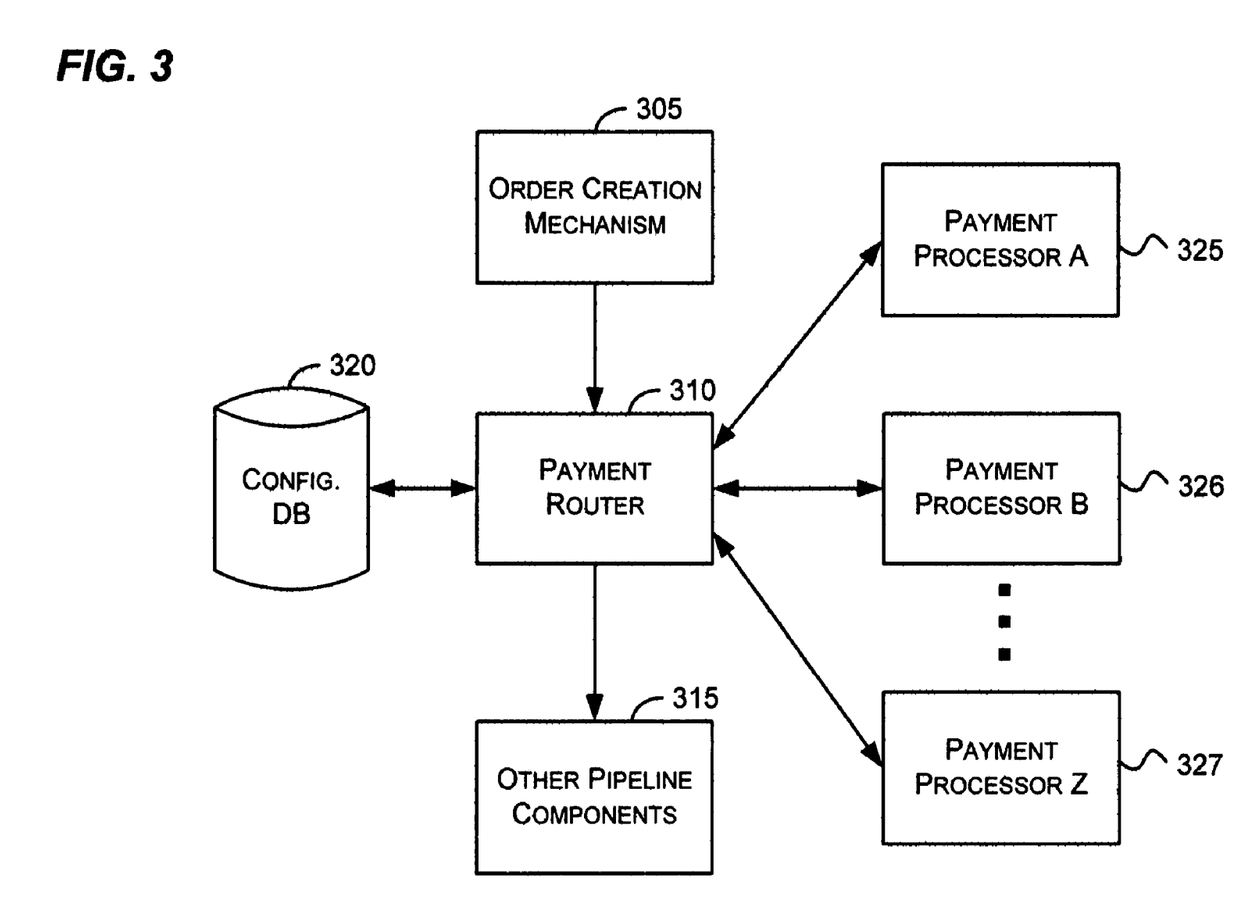
FIG. 3 is a block diagram that generally represents components of a payment system in accordance with aspects of the subject matter described herein.

FIG. 3 is a block diagram that generally represents components of a payment system in accordance with aspects of the subject matter described herein. The order creation mechanism 305 receives order-related input from a client. The order creation mechanism 305 may store order-related information in a shopping cart during the transaction. After the client indicates that the order is complete and that the client wishes to proceed to payment, the shopping cart may be passed to a payment pipeline (of which the payment router 310 is a component).

The payment pipeline may verify that the data associated with the transaction is correct and may gather information from the client as to how the client desires to pay for the order. In doing this, the payment pipeline may execute objects that, for example, expose payment options to the client. In one embodiment, the client may select one or more forms of payment for a single order and may select the amount to be charged to each form of payment. For example, in paying for a $50 order, the client may indicate that the client wishes to redeem a gift certificate of $10, use a cash card for $20, use a first credit card for $10, and use another credit card for $10 to pay for the order.

In recording this payment information, a component of the payment pipeline may create and populate a collection of payment objects to pass to the payment router 310. In one embodiment, an object model, a portion of which is illustrated in FIG. 4, may be used to encode the payment information.

Figure 4:
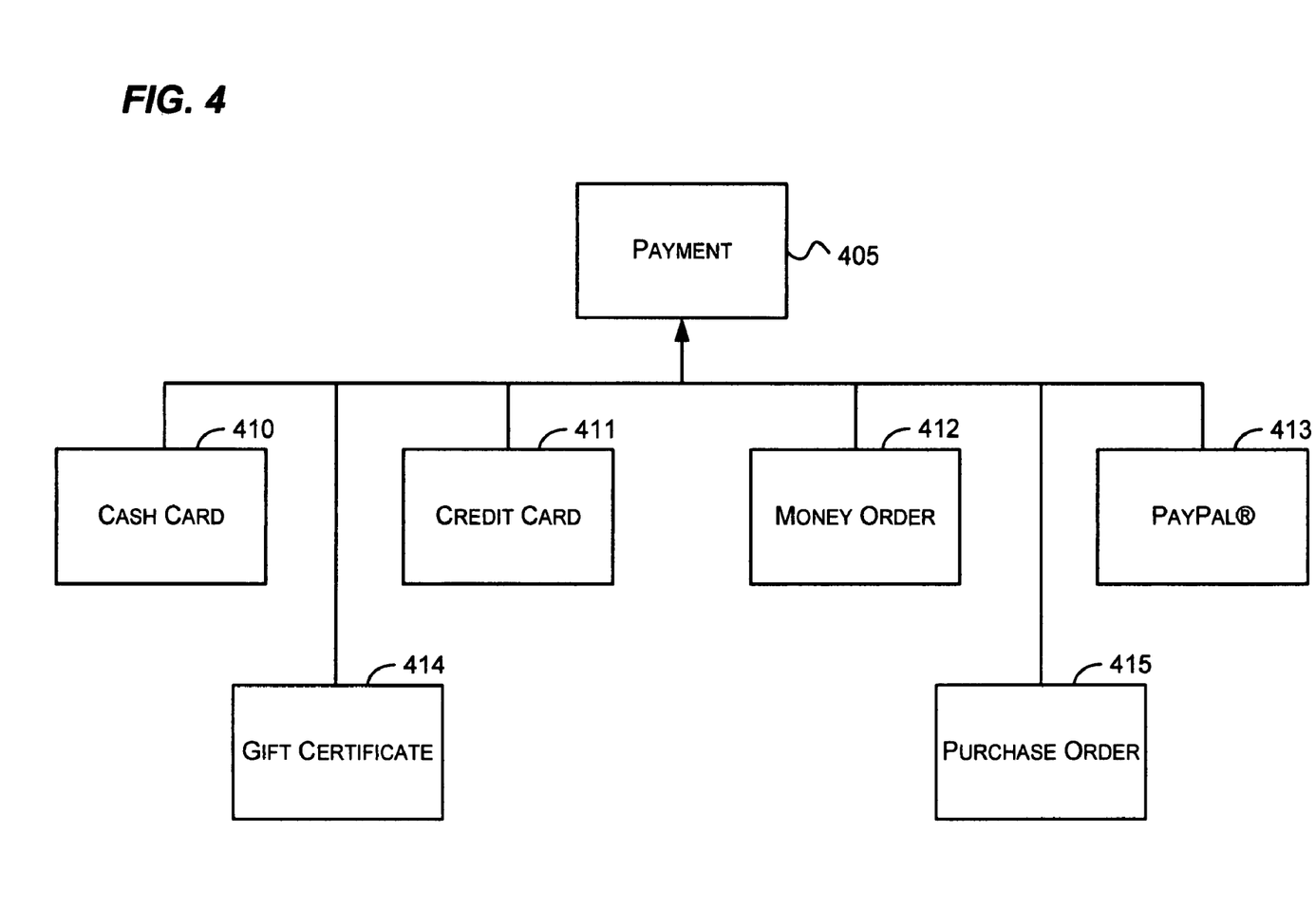
FIG. 4 is a block diagram that represents a portion of an exemplary object model according to aspects of the subject matter described herein.

FIG. 4 is a block diagram that represents a portion of an exemplary object model according to aspects of the subject matter described herein. The objects 410-415 are derived (e.g., inherit characteristics) from the payment object 405. Other objects may be derived from the objects 410-415. For example, the credit card object 411 may have various objects (not shown) that are derived from it that correspond to each of the popular credit cards. Furthermore, in other embodiments, the payment object 405 may have more, fewer, and/or other objects that are derived from it.

It will be recognized that an object model as described herein allows for extensibility with respect to adding new objects that are derived from the payment object 405. For example, additional derived objects may be added to the model as capabilities for processing payments associated with the objects are added.

In another embodiment, a mechanism for allowing weakly-typed objects and properties may be provided. This may be done, for example, to maintain flexibility and compatibility with legacy applications that may not have a strongly-typed representation for objects and properties.

Turning back to FIG. 3, after a collection of payment objects is created, this collection is passed to the payment router 310. The payment router 310 uses information in the configuration database 320 to determine the payment processors 325-327 to which to pass payment requests. The payment router 310 may enumerate through the collection of payment objects, determine the appropriate payment processor for each object, and send a payment request to the appropriate payment processor.

In addition to passing the collection, other information may also be passed to execute appropriate pipelines. For example, information about a shopping cart (e.g., in the form of an OrderForm dictionary) and configuration information needed to execute a pipeline (e.g., in the form of a Context dictionary) may be passed to the payment router.

In one embodiment, the payment being processed is copied to the context dictionary with a key "payment_to_process" and the payment processor pipeline is executed by passing the Context and OrderForm dictionaries. The payment processing pipeline then processes the payment found in the context dictionary. After the successful execution of this pipeline, the payment dictionary is copied back to the OrderForm dictionary.

A system administrator or the like can specify that a payment pipeline work in a backwards compatible mode. In this mode, all keys in a payment are copied to the OrderForm dictionary before executing the payment processing pipeline. After the pipeline completes execution, the keys are removed and any new keys written by the payment processing pipeline are written to the payment dictionary.

Figure 5:
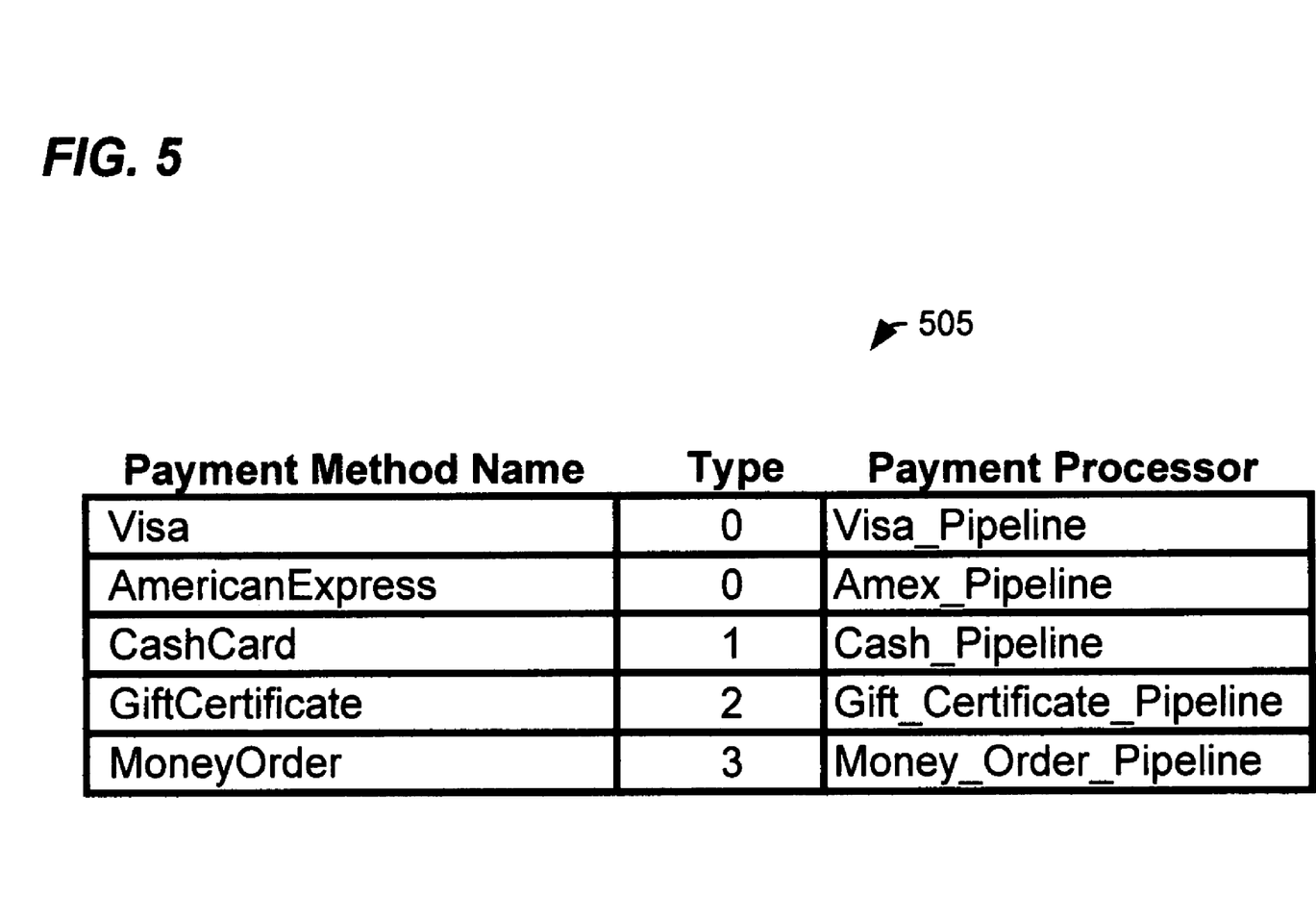
FIG. 5 illustrates a table that may be used in accordance with aspects of the subject matter described herein.

In one embodiment, the configuration database 320 includes a table that associates payment method names with payment processors as illustrated in FIG. 5, which illustrates an exemplary table that may be used in accordance with aspects of the subject matter described herein. Turning to FIG. 5, the table 505 includes three columns. The Payment Method Name column holds identifiers that identify the payment method. For example, a Visa card payment method may be identified by the word "Visa." Similarly, other suitable identifiers may be selected for other payment methods.

The Type column holds identifiers that identify the type of payment method. Related payment methods may have the same identifiers. For example, credit cards may be assigned one type identifier while gift certificates are assigned another type identifier.

The Payment Processor column holds identifiers that identify pipelines associated with particular payment methods. A pipeline includes a set of one or more related components (e.g., processes) that operate on a set of data. The data is passed to a first of the set of components which may perform various operations on the data before passing the data to another component in the pipeline. A component may determine that the data should not be passed to the next component and may also indicate an error or success if needed.

Turning back to FIG. 3, when the payment router 310 receives the collection of payment objects, it examines the objects to determine payment processors to which to route payment requests. Each payment object may include or be associated with a property that indicates the payment method associated with the payment object. This property may then be used in conjunction with table 505 to look up a payment processor to which to route a payment request for the payment object.

It will be recognized that the table 505 allows relatively easy modification of payment processing. For example, by changing the payment processor cell for any particular payment method, the pipeline called in response to the payment method may be quickly changed. Furthermore, when new payment methods and payment processors become available, they may be quickly associated by adding a new row in the table 505.

Figure 6:
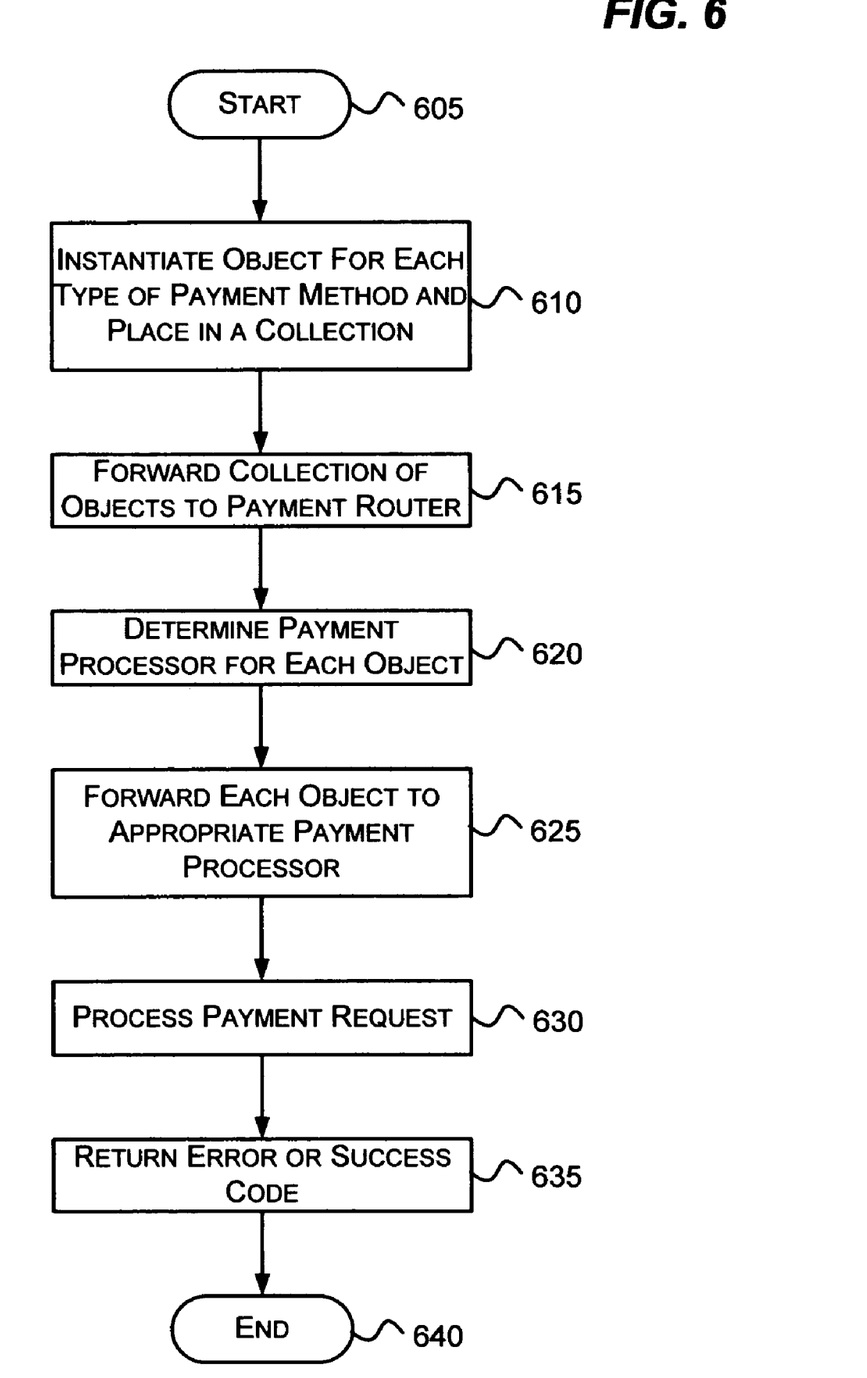
FIG. 6 is a flow diagram that generally represents actions that may occur in accordance with aspects of the subject matter described herein.

FIG. 6 is a flow diagram that generally represents actions that may occur in accordance with aspects of the subject matter described herein. At block 605, the actions begin.

At block 610, an object for each type of payment method is instantiated and placed in a collection. For example, if the client indicates that payment will be made by credit card and gift certificate then a credit card payment object and a gift certificate payment object may be instantiated and placed in a collection.

At block 615, the collection is forwarded to a payment router.

At block 620, the payment router determines a payment process for each object. As described previously, the payment router may consult a table or some other data to make this determination.

At block 625, the object (or data derived therefrom) is forwarded to an appropriate payment processor. In one embodiment, this is accomplished by executing a pipeline that executes a process. The pipeline may include one or more components.

At block 630, the payment processor processes the payment. At block 635, an error or success code may be returned.

At block 640, the actions end.

It should be understood that the actions described in conjunction with FIG. 6 may not be all-inclusive of all the actions that may be taken in processing a payment. Furthermore, although the actions are described as occurring in a particular order, in other embodiments, some of the actions may occur in parallel or may be performed in another order without departing from the spirit or scope of the subject matter described herein.

As can be seen from the foregoing detailed description, aspects have been described related to payment processing. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having stored computer-executable instructions comprising an application for routing a plurality of payment methods to a plurality of payment processors, wherein when executed, the computer-executable instructions perform a method comprising the following:

receiving input from a user that specifies that payment objects corresponding to a first payment method are to be sent to a first payment processor;

receiving input from the user specifying that payment objects corresponding to a second payment method are to be sent to a second payment processor;

storing the first and second inputs in a database table, wherein the database table includes a payment method column and a payment processor column such that each payment method listed in the database table is associated with a payment processor defined in the same row as the payment method such that the payment processor to which a corresponding payment method is sent is updatable by modifying the value of the payment processor in the corresponding row of the database table without requiring the recoding of the application and such that by modifying the payment processor value in the same row as the payment method, a corresponding payment method is sent to a different payment processor corresponding to the modified payment processor value;

receiving input from a second user regarding a set of one or more goods to purchase in a single purchase transaction;

receiving input from the second user regarding a plurality of payment methods by which the set of one or more goods are to be purchased;

creating a collection of payment objects wherein the collection contains an object for each payment method, wherein each object indicates the associated payment method and an amount to pay using the payment method for which the object was created;

receiving the collection of payment objects at a payment router, wherein each of the payment objects is associated with other information that includes information about a shopping cart in the form of an OrderForm dictionary, and configuration information needed to execute a pipeline in the form of a Context dictionary;

the payment router accessing each payment object in the collection of payment objects to determine the associated payment method for each payment object;

the payment router using the associated payment method for each payment object to retrieve the corresponding payment processor from the database table; and the payment router sending data derived from each payment object to the corresponding payment provider to request payment in the amount specified in the payment object.

2. The computer storage medium of claim 1, wherein the plurality of payment methods comprise one or more of a credit card, a cash card, a gift certificate, a purchase order, a money order, and a proprietary payment method.

3. The computer storage medium of claim 1, wherein the plurality of payment methods comprise at least two credit cards.

4. The computer storage medium of claim 1, wherein the database table further includes:

an identifier type column with identifier type fields storing type identifiers for identifying payment method types, wherein each different type of payment method is associated with a different type identifier within the identifier type field of the database table.

5. The computer storage medium of claim 4, wherein related payment methods are associated with the same type identifier, with credit card payment methods being identified by a first type identifier, cash cards being identified by a second type identifier, gift certificates being identified by a third type identifier, and money orders being identified by a fourth type identifier.

6. The computer storage medium of claim 1, wherein sending data derived from each payment object to the corresponding payment provider to request payment in the amount specified in the payment object comprises executing a pipeline for each object and providing the object to the pipeline, wherein the pipeline includes a payment router and one or more corresponding payment processors.

7. The computer storage medium of claim 1, wherein the one or more goods further comprises one or more services.

8. A method performed by an application that is executed by a processor of a computer, the method comprising:
receiving input to the computer from a user that specifies that payment objects corresponding to a first payment method are to be sent to a first payment processor;
receiving input to the computer from the user specifying that payment objects corresponding to a second payment method are to be sent to a second payment processor;
storing the first and second inputs in a database table which is stored in a computer storage medium of the computer, wherein the database table includes a payment method column and a payment processor column such that each payment method listed in the database table is associated with a payment processor defined in the same row as the payment method such that the payment processor to which a corresponding payment method is sent is updatable by modifying the value of the payment processor in the corresponding row of the database table without requiring the recoding of the application and such that by modifying the payment processor value in the same row as the payment method, a corresponding payment method is sent to a different payment processor corresponding to the modified payment processor value;
receiving input to the computer from a second user regarding a set of one or more goods to purchase in a single purchase transaction;
receiving input to the computer from the second user regarding a plurality of payment methods by which the set of one or more goods are to be purchased;
creating a collection of payment objects in memory of the computer wherein the collection contains an object for each payment method, wherein each object indicates the associated payment method and an amount to pay using the payment method for which the object was created;
receiving the collection of payment objects at a payment router that is being executed by the processor of the computer, wherein each of the payment objects is associated with other information that includes information about a shopping cart in the form of an OrderForm dictionary, and configuration information needed to execute a pipeline in the form of a Context dictionary;
the payment router accessing each payment object in the collection of payment objects to determine the associated payment method for each payment object;
the payment router using the associated payment method for each payment object to retrieve the corresponding payment processor from the database table; and
for each payment object:
the payment router copying data derived from the payment object to the associated Context dictionary with a payment-to-process key; and
the payment router routing a payment request corresponding to the payment object to the corresponding payment provider to request payment in the amount specified in the payment object by executing the pipeline using the Context dictionary and OrderForm dictionary.

9. The method of claim 8, further comprising subsequent to sending data derived from each payment object to the corresponding payment provider, receiving input from the user that specifies that payment objects corresponding to the first payment method are to be sent to a third payment processor such that the database table is updated such that the third payment processor is associated with the first payment method without requiring the application to be recoded.

10. The method of claim 8, wherein a type of the first payment method comprises a credit card, a cash card, a gift certificate, a purchase order, or a money order.

11. The method of claim 10, wherein a type of the second payment method is different than the type of the first payment method.

* * * * *